(12) United States Patent
Harrison

(10) Patent No.: US 6,412,216 B1
(45) Date of Patent: Jul. 2, 2002

(54) POSITIONING TECHNIQUE FOR HORTICULTURAL APPARATUS

(76) Inventor: Samuel James Harrison, 260 Hoghton Lane, Hoghton, Preston, Lancashire PR5 0JH (GB)

( * ) Notice: Subject to any disclaimer, the term of this patent is extended or adjusted under 35 U.S.C. 154(b) by 0 days.

(21) Appl. No.: 09/581,787
(22) PCT Filed: Dec. 16, 1998
(86) PCT No.: PCT/GB98/03780
  § 371 (c)(1),
  (2), (4) Date: Jun. 16, 2000
(87) PCT Pub. No.: WO99/30554
  PCT Pub. Date: Jun. 24, 1999

(30) Foreign Application Priority Data

Dec. 16, 1997 (GB) .............................. 9726444
Sep. 30, 1998 (GB) .............................. 9821077

(51) Int. Cl.[7] ................................. A01G 9/14
(52) U.S. Cl. ............................. 47/18; 296/20
(58) Field of Search .................. 47/18, 17, 1.01 R; 296/20

(56) References Cited

U.S. PATENT DOCUMENTS

| | | | | |
|---|---|---|---|---|
| 838,229 A | * | 12/1906 | Hoyt | 47/18 |
| 1,617,940 A | * | 2/1927 | Chase | 47/17 |
| 3,529,379 A | * | 9/1970 | Ware | 47/18 |
| 3,842,534 A | * | 10/1974 | Walters et al. | 47/1.1 |
| 4,422,375 A | * | 12/1983 | Morganti | 47/1.1 |
| 4,837,971 A | * | 6/1989 | Visser | 47/17 |
| 5,040,328 A | * | 8/1991 | Coon | 47/1.1 |
| 5,471,827 A | | 12/1995 | Janssen et al. | |

FOREIGN PATENT DOCUMENTS

| | | | |
|---|---|---|---|
| FR | 2 582 188 | | 11/1986 |
| GB | 2269732 A | * | 2/1994 |
| NL | 8102507 | | 12/1982 |
| NL | 8102507 A | * | 12/1982 |
| NL | 9300418 | | 10/1994 |
| WO | 89/06900 | | 8/1989 |

* cited by examiner

Primary Examiner—Peter M. Poon
Assistant Examiner—Jeffrey L. Gellner
(74) Attorney, Agent, or Firm—Mayer, Brown, Rowe & Maw

(57) ABSTRACT

A tray (2) includes a framework comprising first and second elongate side members (4, 6) and first and second end members (8, 10). The members (4, 6, 8, 10) support a rectangular floor of the tray, defined by a metal mesh (12a) or grid arrangement (12b). A sheet (14) of woven fabric material is arranged to define a multiplicity of elongate channels (16). The sheet (14) is supported at its ends by cords (18) which releasably engage end members (8, 10). End member (8) includes a tensioning arrangement (20) for adjusting the tension in the cords. In use, the channels (16) are filled with compost and plants are grown therein. A tray (2a) may be situated in a greenhouse with other trays (2). It may be removed from the greenhouse using a carriage device which can move underneath tray (2a), lower it and then drive it out of the greenhouse by causing it to pass under adjacent trays (2b and 2c). Other trays may be moved in a similar manner. Accessory means for cooperation with tray (2) are described and may comprise cutting apparatus (150) or a cultivator (170).

17 Claims, 16 Drawing Sheets

POSITIONING TECHNIQUE FOR HORTICULTURAL APPARATUS

This invention relates primarily to horticulture and particularly, although not exclusively, relates to a method of moving a horticultural apparatus in a horticultural environment. The invention also provides a horticultural apparatus per se, a plant cultivating apparatus, an accessory means, a method of plant cultivation and other novel apparatus and methods.

Many plants are grown in greenhouses, at least for some time. However, greenhouses are expensive to build, maintain and run and, accordingly, the use of greenhouse space must be maximised in order to minimise plant unit costs.

The most widely used apparatus in which plants may be grown is a "plant pot" which is generally a circular cross-section plastics container having holes in its base for passage of water from the pot. Plant pots are filled with compost or soil and seeds or seedlings planted therein.

Commercial growers may use machines to fill pots with soil; however such machines are expensive. There are other problems associated with the use of plant pots by commercial growers. For example, the use of individual plant pots for each plant adds to the costs involved in growing plants; the soil/compost contained in the plant pots tends to hold a relatively large amount of moisture and this adds to the overall weight of the plants which may increase the costs involved in transporting the plants; the plant pots restrict the passage of air through the compost/soil in the pots; and the roots of the plants may be damaged when they are removed from their pots. Furthermore, plant pots are placed side-by-side in a staggered arrangement when plants are being grown. To feed the plants, feed pellets are scattered and/or liquid feed is sprayed over the pots. However, since there are gaps between adjacent pots, up to 20% of the feed may be wasted which again adds to costs. Additionally, it is difficult to clean and/or sterilise plants pots and, consequently, plant pots may not be re-used or, if they are, there is a risk that disease may be spread to seeds and/or seedlings that are planted in unsterilised pots.

It is an object of the present invention to address the above described problems.

According to a first aspect of the present invention, there is provided a method of moving a first horticultural apparatus which is arranged in a first position in a horticultural environment to a second position, wherein the horticultural environment is such that said first horticultural apparatus cannot be moved from said first position to said second position whilst maintaining said first horticultural apparatus at a first height relative to a second horticultural apparatus, the method comprising adjusting the height of the first horticultural apparatus relative to that of said second horticultural apparatus and using a transportation means to move said first horticultural apparatus to said second position.

Suitably, in the context of this specification, references stating that an apparatus cannot be moved suitably mean that the apparatus is impeded, for example blocked, from the movement referred to.

The method may include adjusting the height by a distance of at least 100mm, suitably at least 200 mm, preferably at least 300 mm, more preferably at least 350 mm, especially at least 400 mm. Said distance may be less than 1000 mm, suitably less than 900 mm, preferably less than 800 mm, more preferably less than 700 mm, especially less than 600 mm. Said distance is preferably predetermined.

Preferably, said first apparatus is moved along a substantially horizontal plane during movement to said second position. Preferably, said first apparatus moves substantially within a single horizontal place during movement to said second position.

Preferably, said first apparatus is moved substantially parallel to a surface which supports it during movement to said second position.

The method may include adjusting the height of the first apparatus and/or the second apparatus relative to a reference level which may suitably be the ground or other surface on which said first and/or said second apparatus is supported. Preferably, however, the height of the first apparatus is adjusted, preferably with the height of the second apparatus relative to said reference level being kept constant.

Preferably, said first or said second apparatus is arranged under part of the other one of said second or said first apparatus during passage of said first apparatus from said first position to said second position. Preferably, said first apparatus is arranged under part of said second apparatus during said passage.

Preferably, said horticultural environment includes a third horticultural apparatus and preferably said first apparatus cannot be moved from said first position to said second position whilst maintaining said first apparatus at a said first height relative to said third apparatus. Thus, the method preferably includes adjusting the height of the first apparatus relative to that of said third apparatus. The method may include adjusting the height of the first apparatus and/or the third apparatus relative to said reference level. Preferably, however, the height of the first apparatus is adjusted, preferably with the height of the third apparatus relative to said reference level being kept constant.

Preferably, said first apparatus or said third apparatus is arranged under part of the other one of said third or said first apparatus during passage of said first apparatus from said first to said second position.

Preferably, the first apparatus passes under part of the second and third apparatuses during passage from said first to said second position.

Preferably, said horticultural environment includes a plurality of horticultural apparatuses in a first row. Said first row may include said first and second apparatuses. Said first and second apparatuses suitably each have an elongate axis. During movement of said first apparatus, the elongate axis of said first apparatus may move through an angle of at least 30°, preferably at least 60°, more preferably at least 75°, especially at least about 90°. Preferably, prior to movement of said first apparatus, said elongate axes of said first and second apparatuses are substantially parallel. During movement of said first apparatus, the axes may be angled relative to one another.

Preferably, each horticultural apparatus in said first row is substantially the same width and/or length and, more preferably, each is substantially identical to the others.

Preferably, prior to movement of said first apparatus, respective ends of the first and second apparatuses are substantially in line. Preferably, prior to movement of said first apparatus, a first gap is defined between said first and second apparatuses in the direction of extent of said first row. Said first gap may be less than the width of said first and/or said second apparatus. Said gap may have a width which is less than 60%, preferably less than 50%, more preferably less than is 40%, especially less than 30% of the width of said first and/or said second apparatus. Said gap is preferably large enough so that a person can pass between said first and second apparatuses. In some circumstances, however, substantially no gap or a very narrow gap (which may not be large enough for passage of a person between the first and second apparatuses) may be defined.

Said horticultural environment preferably includes a plurality of horticultural apparatuses in a second row which is suitably spaced from said first row. Said second row preferably includes said third apparatus, when provided.

Preferably, each horticultural apparatus in said second row is substantially the same width and/or length and, more preferably, each is substantially identical to the others.

Preferably, said first and second horticultural apparatus and suitably other horticultural apparatus in said horticultural environment are supported, prior to the movement under the control of the transportation means, on the same support surface which may be the ground, a floor (or the like).

Preferably, said first and second rows extend substantially parallel to one another. A second gap is preferably defined between said first and second rows which gap may define an aisle for passage of said first apparatus out of said horticultural environment. Said second gap preferably has a width which is less than three times the maximum width of said first apparatus. Said second gap is preferably less than twice, more preferably less than 1½ times the maximum width of said first apparatus. In one embodiment said second gap is greater than the maximum width of said first apparatus. However, it is possible and it can be advantageous for the second gap to be less than the maximum width of said first apparatus. Thus, in a second embodiment, the width of the second gap may be less than 90%, suitably less than 80%, preferably less than 70%, more preferably less than 60%, especially less than 50% of the maximum width of said first apparatus. In some circumstances, the second gap may have a negligible width in which case, the first and second rows may substantially abut one another.

When said third apparatus is provided in said second row, it may be arranged opposite, at least in part, said second apparatus in said first row.

Preferably, elongate axes of said horticultural apparatuses in said second row extend substantially parallel to one another.

Preferably said first apparatus moves along a travel path between said first and second positions. Said travel path is preferably curved.

Said transportation means may be arranged both to adjust the height of the first apparatus relative to the second apparatus and to move it to said second position.

The method may include the step of moving said second and/or said third apparatus from said horticultural environment. Movement of said second and third apparatus may include any of the steps described above for movement of the first apparatus. Thus, preferably, the height of the second and/or third apparatus is arranged to be adjusted to allow one or each to be moved.

The method may include the step of moving said first apparatus from said second position to said first position. In this case, when said first apparatus has been returned to the first position its height relative to said second apparatus may be adjusted.

Preferably, a first support means is provided for supporting said first apparatus at a first height. Said first support means preferably includes a first support assembly on one side of the centre of gravity of said first apparatus and a second support assembly on an opposite side of the centre of gravity. Said first support assembly is preferably securable at a plurality of positions on said one side which positions may differ in their distance from the centre of gravity of the first apparatus. Said second support assembly is preferably securable at a plurality of positions on said opposite side which positions may differ in their distance from the centre of gravity. Said first support assembly and/or said second support assembly may each comprise a pair of legs which are suitably arranged to be fixed at or adjacent opposing sides of the first apparatus. Said first support assembly and/or said second support assembly is/are preferably movable between an operative position in which said first apparatus is supported and an inoperative position in which said first apparatus may not be supported. In one embodiment, said first support assembly and/or said second support assembly is/are detachable, thereby to define said inoperative position. In another embodiment, said first support assembly and/or said second support assembly is/are pivotable between operative and inoperative positions. A catch means may be provided for releasably securing said first and/or second support assemblies in operative position(s). Said first assembly may be pivotable in a first direction and said second assembly may be pivotable in a second direction. Said first and second directions may be substantially perpendicular to one another.

Said first apparatus may include means for cooperation with said first support means, for example, means for releasably securing said first support means in position. Means for cooperation may be provided at a plurality of positions on said first apparatus so that said first support means can be secured to said first apparatus at a plurality of positions.

In the method, said transportation means is preferably moved to a position which is disposed inwardly of at least one of the first or second support assemblies. For example, said transportation means may be moved to a position which is underneath an area between said first and second support assemblies. Said transportation means may be arranged to contact said area for supporting the first apparatus prior to movement.

Preferably, a second support means is provided for supporting said second apparatus. Said second support means preferably includes a said first support assembly on one side of the centre of gravity of the second apparatus and a said second support assembly on an opposite side of the centre of gravity. Said first and second support assemblies of the second support means may have any features of the support assemblies of the first support means described above.

Preferably, in the method, during movement from said first position to said second position, said first and second support assemblies of said second apparatus are asymmetrically arranged on opposite sides of the centre of gravity. Preferably, a support assembly which is closest to a path of travel of said first apparatus towards said second position is closer to the centre of gravity than the other support assembly. Preferably, said support assembly which is closer to the centre of gravity is arranged at a position which is at least 20% of the distance between an end of the first apparatus which is closer to the path of travel of the first apparatus towards said first position and a line through the centre of gravity parallel to the direction of extent of said end. Said position may be at least 30%, preferably at least 40%, more preferably at least 50%, especially at least 60% of said distance.

Where a third apparatus is provided as described above, a third support means is preferably provided for supporting said third apparatus. Said third support means may have any feature of said second support means described above. Preferably, the smallest distance between support assemblies of said second and third support means is greater than the width of the first apparatus so that said first apparatus can pass therebetween. Said smallest distance may be at least 1.5, preferably at least 2, more preferably at least 2.5, times the width of said first apparatus.

Said transportation means is suitably a transportation apparatus which preferably comprises a support surface for supporting said first apparatus. Said support surface is preferably movable between first and second positions, suitably along a predetermined travel path. Said support surface is preferably arranged to accommodate part of a support means, for example a leg of a said horticultural apparatus. For example, a horticultural apparatus may include an opening, for example a channel below its support surface for accommodating a said support means. A lifting means is preferable provided for moving said support surface. Said lifting means may comprise a scissor lift or the like. Said transportation means preferably includes rolling means for example in the form of one or a plurality of wheels or the like, arranged to roll over a surface over which the transportation means may travel. Preferably, the maximum width of the support surface is not more than 50%, preferably not more than 30%, of the width of the first apparatus.

Preferably, said first horticultural apparatus includes one or more receptacles for growing plants or the like. Said first apparatus is preferably substantially quadrilateral in plan view, suitably with opposing sides extending substantially parallel to one another. Said first apparatus is preferably elongate. The width of the apparatus may be less than 80%, suitably less than 70%, preferably less than 60%, more preferably less than 50%, especially less than 40% of the length of the apparatus. The width may be greater than 10%, preferably greater than 20%, more preferably greater than 25%, especially greater than 30% of the length. Said apparatus is preferably substantially rectangular in top plan view. Said apparatus is preferably suitably rectangular in side and/or end views.

Said first apparatus is preferably arranged to cooperate with accessory means described hereinafter. Said first apparatus may include guide means, for example guide rails, for guiding travel of the accessory means relative to the apparatus.

Said first apparatus preferably comprises a frame. Said frame may comprise first and second side frame members which are rigidly spaced apart by first and second end members. Said first and second side frame members preferably define said guide means, suitably in the form of respective planar surfaces over which said accessory means may travel.

Said frame preferably supports a receptacle means defining a plurality of receptacles for growing plants. Said first apparatus is preferably arranged for movement of said receptacle means from a configuration in which said plurality of receptacles are defined to a position in which said receptacle are at least partially disassembled. By at least partially disassembling said receptacles, plants may be relatively easily removed.

Said receptacle means preferably defines a plurality of walls which extend substantially parallel to one another. Said plurality of walls are preferably arranged to define a plurality of receptacles which suitably extend substantially parallel to one another. Preferably, a plurality of said walls is movable from respective first positions to respective second positions. Preferably, a said wall is pivotable for movement between first and second positions. Said wall may be pivotable about a hinge or, preferably, a fold. Said walls preferably extend upwardly. Said walls preferably extend substantially vertically upwardly. Such upwardly extending walls suitably define side walls of the receptacle.

The or each receptacle preferably includes a base wall which suitably abuts a surface, preferably of said first apparatus. First and second spaced apart parts of said base wall preferably abut a surface. Said first and second parts are preferably at or towards respective ends of the receptacle(s). One or preferably a plurality of intermediate parts, arranged between said first and second parts, preferably abut a said surface. For example, said frame may include a support surface in the form of a grid, mesh or the like. Walls preferably extend along opposing sides of the base wall. Each of said walls is preferably movable as described. Preferably, upwardly extending walls of said receptacle are pivotable relative to a said base wall.

The or each said receptacle is preferably in the form of a channel. The or each channel is preferably upwardly open.

At least some, preferably all, of said walls may be arranged to allow liquid, for example water to pass therethrough. Said walls are preferably arranged to allow a gas, for example air to pass therethrough.

At least some, preferably all, of said walls may be made from a porous material. Said walls are preferably made from an inert material. Said walls are preferably made from a flexible material. Said walls are preferably made from a material that is not self-supporting. Said walls are preferably made from a woven material. Said walls are preferably made from a textile material. Said walls are preferably made from a synthetic material, for example a polymeric material which can be drawn into threads. Woven polypropylene material is a preferred material.

Preferably, walls of said receptacle means are defined by folding a sheet of material. Preferably, said plurality of walls are formed from a single piece, for example a single sheet, of material. Said material is preferably folded to define the or each receptacle.

Said first apparatus preferably includes tension means for adjusting the tension in the walls of said receptacle means, in the direction of their extent. Said tension means may include connection means for connecting the walls to first and second parts of a tensioning device. Said connection means may comprise a length of material which may be cord or the like and which extends between said first and second parts. A first part of said tensioning device may comprise a part of said frame, for example said first end member thereof. Said second part may comprise said second end member. A component of said second end member is preferably movable, for example pivotable, for adjusting the tension.

Said frame is preferably arranged for disassembly of said plurality of receptacles. To this end, said frame may be arranged to be dissembled at least in part. For example, a part of second frame, for example a side or end wall, may be disengagable from the other parts of the frame. Preferably, said frame can be disassembled so that said receptacle means can be detached therefrom and/or so that the receptacles can be moved to partially disassembled configurations.

Thus, the method may include the step of after said first apparatus has been moved to said second position. The first apparatus may subsequently be reassembled.

Whilst the invention of the first aspect specifically refers to a method for use in horticulture, the method of moving described herein may have more general, non-horticultural, applications. Accordingly, the invention extends to a method of moving a first apparatus which is arranged in a first position in an environment to a second position, wherein the environment is such that said first apparatus cannot be moved from said first position to said second position whilst maintaining said first apparatus at a first height relative to a second apparatus, the method comprising adjusting the height of the first apparatus relative to that of said second apparatus and using a transportation means to move said first apparatus to said second position.

Any feature of the first aspect may be applied to the more general method described. Where a feature according to said first aspect is described as "horticultural" (or similar word) then this description may be omitted when referenced to the more general method.

According to a second aspect of the present invention, there is provided a first horticultural apparatus as described in any statement herein per se.

According to a third aspect of the present invention, there is provided plant cultivating apparatus comprising a first apparatus according to said second aspect and an accessory means.

Said accessory means may comprise trimming means for trimming plants growing in said first apparatus. Said trimming means is preferably arranged to be guided along a guide means of said first apparatus. Said trimming means may comprise a cutting element, for example a blade, and, preferably, means for urging plants to be cut towards said blade. A collection means may be provided for collecting cuttings.

Said accessory means may comprise a breaking means for breaking up the surface of a growing medium associated with said first apparatus. Said breaking means is preferably arranged to be guided along a guide means of said first apparatus. Said breaking means may comprise means for contacting the surface of said growing medium.

Said accessory means may comprise a storage means which is suitable arranged to be positioned adjacent said first apparatus such that an accessory means arranged to be guided by said first apparatus can travel from said first apparatus onto a guide means of said storage means.

Said accessory means may comprise a seeder, a means for delivering liquid or a means for removing insects.

The plant cultivating apparatus may include one or a plurality of accessory means as described.

The invention extends to an accessory means as described in any statement herein per se.

The invention extends to a horticultural method which utilises a guide means associated with an array of living members, for example plants, the method comprising causing an accessory means to cooperate with said guide means, wherein the accessory means is movable under the guidance of the guide means for carrying out a horticultural operation on or in the vicinity of living members in the array.

The height above the ground and/or the orientation of the guide means relative to a surface, for example the ground, may be adjustable. At least two adjustment means may be provided for adjusting said height and/or orientation. Preferably, three or, more preferably, four adjustment means are provided. Each adjustment means is preferably independently operable. A frame means may include said guide means, wherein said frame means is suitably arranged to be supported on said surface. Preferably, said array of living members is supported on said surface.

Said guide means is preferably portable and the method may involve moving the guide means to a position in which the array is disposed. Said guide means preferably includes two spaced apart guide tracks for cooperation with the accessory means. Said guide tracks may have any feature of the guide means/guide rails of the first aspect.

Said accessory means may be as described in any statement herein.

The invention further extends to a guide means for use in a horticultural method per se.

The invention further extends to a transportation means as described according to said first aspect, the transportation means including a support surface for supporting a horticultural apparatus, wherein said support surface is arranged to accommodate part of a support means, for example a leg, of a said horticultural apparatus.

The invention further extends to a disassembly support means for supporting a horticultural apparatus, the disassembly support means comprising a support surface for supporting the horticultural apparatus. Said support surface suitably includes a conveying means for conveying a said horticultural apparatus from a transportation means onto the support surface of the disassembly support means and/or said support surface may be arranged to accommodate part of a support means, for example a leg, of said horticultural apparatus.

The invention extends to a transportation means in combination with a disassembly support means and/or with a horticultural apparatus.

The invention extends to a method of plant cultivation using a first horticultural apparatus or a plant cultivating apparatus as described in any statement herein.

Any feature of any aspect of any invention or embodiment described herein may be combined with any feature of any aspect of any other invention or embodiment described herein.

Specific embodiments of the invention will now be described, by way of example, with reference to the accompanying diagrammatic drawings, in which.

In the figures, the same or similar parts are annotated with the same reference numbers.

Figure 1:
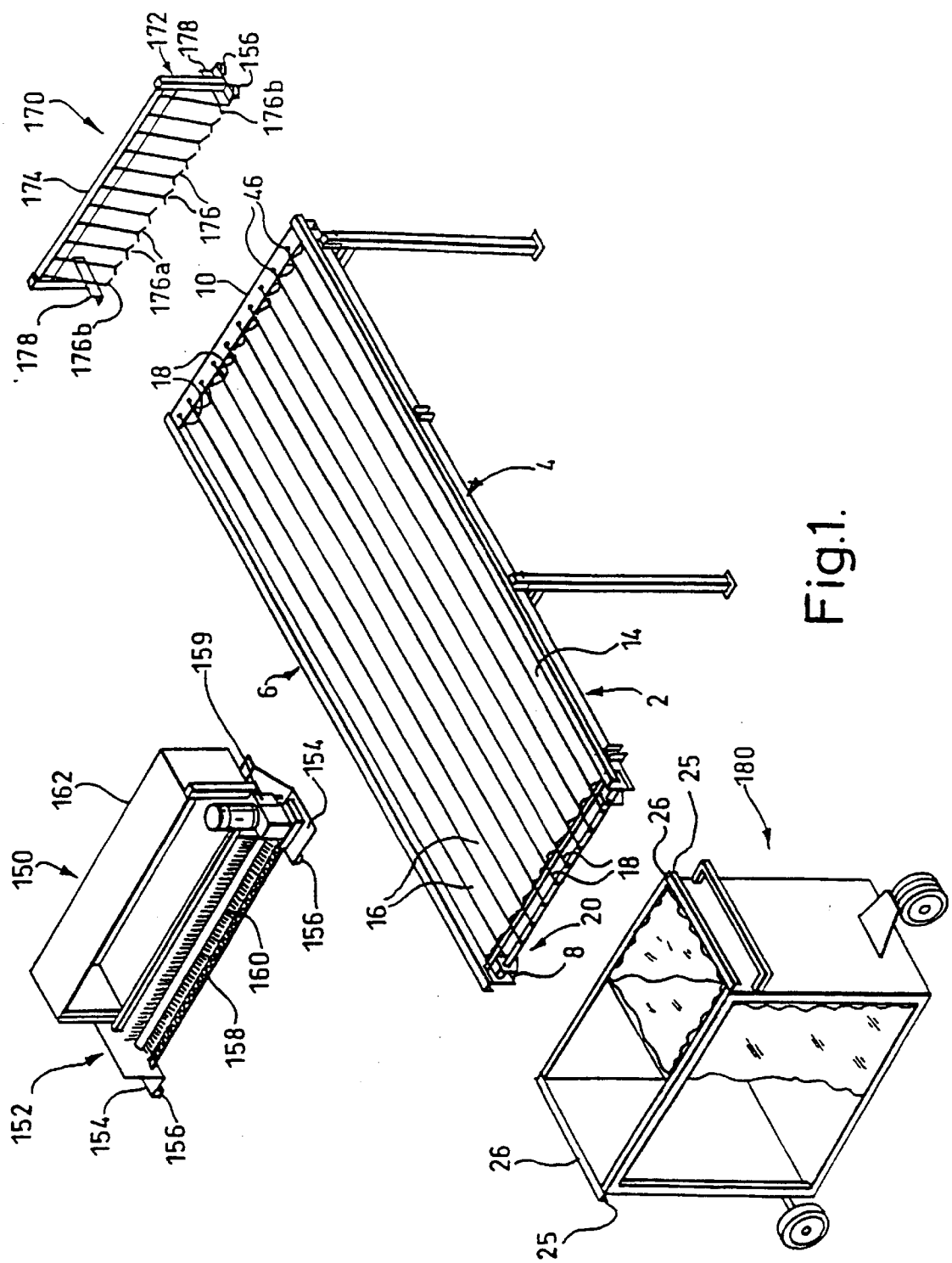
FIG. 1 is a perspective view of a tray supported on legs and showing, schematically, a cutting apparatus, a cultivating apparatus and a storage trolley which are arranged to cooperate with the tray.

The tray 2 includes a framework comprising first and second elongate side members 4, 6 and first and second end members 8, 10. The members 4, 6, 8, 10 support a rectangular floor of the tray, defined by a metal mesh 12a or grid arrangement 12b. A sheet 14 of woven fabric material is arranged to define a multiplicity of elongate channels 16. The sheet 14 is supported at its ends by cords 18 which releasably engage end members 8, 10. End member 8 includes a tensioning arrangement 20 for adjusting the tension in the cords. In use, the channels 16 are filled with compost and plants are grown therein.

Further details are provided below.

Side member 6 includes an upstanding part 22, from a lower end of which a thin planar inwardly extending horizontally disposed support flange 24 extends. A thin planar support flange 26 extends horizontally outwardly from an upper end of the part 22. A lip 25 extends downwardly from flange 26.

Side member 4 is a mirror image of side member 6. Each of the side members include four spaced apart outwardly open leg receiving channels 28 fixed to the outsides of the upstanding parts 22.

End member 10 comprises a main body part 30 from which a thin planar inwardly extending horizontally disposed support flange 32 extends. Pins 34 extend upwardly from body part 30.

End member 8 comprises a rigid support body 36 which includes end plates 38 and an inwardly extending horizontally disposed support flange 39. Support plates 40 are fixed to the body 36 and support a rotatably mounted tensioning cross-bar 42 which is a part of the tensioning arrangement 20. Arrangement 20 also includes a ratchet arrangement 44 for releasably fixing the rotational position of the cross-bar 42. Pins 34 extend outwardly from the cross-bar 42.

The members 4, 6, 8, 10 are secured together by quick-release anti-luce retainers 44 so that support flanges 24, 32 and 39 define a substantially planar seat on which mesh or grid arrangement 12 a/b can be supported and so that sides 4 or 6 can be relatively quickly removed to disassemble the tray 2, at least partially.

The parts of the tray 2 described above (excluding sheet 14) are substantially made of metal, preferably steel.

Four metal legs 50 are provided for supporting the tray 2 off the ground. Each leg 50 includes an upstanding part 52 and a horizontally extending part 54 which includes a collar 56 which defines a socket for receiving an end 58 of an opposite leg. In use, a pair of legs 50 is moved towards the tray 2 so that end 58 of one leg engages collar 56 of the opposite leg and each portion 60 of an upstanding part 52 engages a respective channel 28, so that the tray rests upon horizontally extending parts 54. Quick release anti-luce retainers 62 are provided for releasably securing legs 50 in position. Pairs of legs 50 can be engaged with any opposing pair of channels 28 depending on the circumstances as will be described hereinafter.

Figure 5:
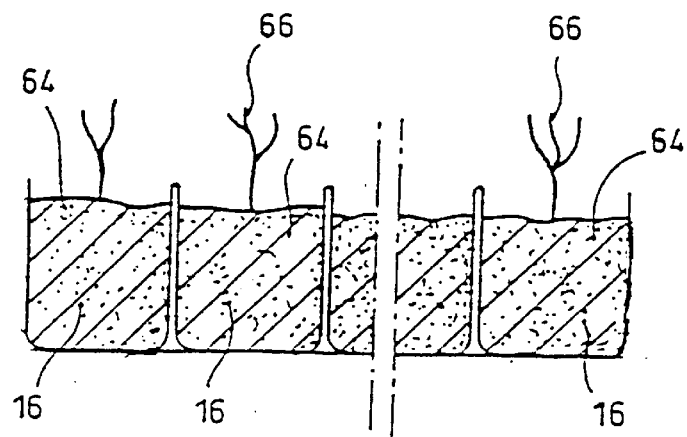
FIG. 5 is a schematic traverse cross-section through a part of the tray showing the arrangement of flexible sheet material which defines channels in which plants are grown (parts of the tray itself are omitted in the interests of clarity)

The sheet 14 preferably comprises a flexible, non-self-supporting, porous material. A polypropylene material is preferred. As shown in FIG. 3, lengths of cord 18 are stitched (or otherwise secured) at suitably spaced apart positions to the sheet 14, so that the lengths of cord extend parallel to one another longitudinally of the sheet. Eyelets 46 are defined at each end of the cords. The sheet/cord arrangement can readily be formed into the arrangement of FIGS. 1 and 2. To this end, the eyelets 46 at one end of the sheet are secured to the pins 34 on end member 10. Then, each of the eyelets 46 at the other end of the sheet are engaged with pins 34 associated with cross-bar 42. Initially, the sheet is relatively slack. However, the cross-bar 42 can be rotated under the control of the ratchet arrangement in order to cause the sheet to tauten and thereby define channels 16 which can be filled with compost 64 and plants 66 grown therein as shown in FIG. 5.

It should be appreciated that the seeds/seedlings/plants in channels 16 can be fed and/or watered by scattering food and/or spraying water over the whole of the planting assembly and that, since there are no gaps in the assembly, no food/water is wasted. Furthermore, since the channels are made of a porous material (which allows both water and air to pass), the environment in which the seeds/seedlings/plants grow is more akin to the natural growing environment compared to the environment appertaining when growing is carried out in conventional plant pots.

Once plants grown in a tray 2 have reached the desired height, the tray may be moved to a disassembly location. For example, the tray may be placed on a bench, on the ground or on another surface. When so disposed, side member 4 may be removed by releasing retainers 44. Then, tension is released in the tensioning arrangement 20 and the eyelets disengaged from pins 34. The sheet 14 can then be pulled into a flattened state, thereby leaving rows of elongate blocks of compost in which the plants are arranged. These blocks may then be cut transversely to define a block comprising a single plant.

After removal of the plants, the sheet 14 and tray 2 can be re-used.

As described above, it is desirable to optimise use of space in a greenhouse or other confined space. A system for doing this using trays 2 is described hereinafter. However, it should be noted that the system described may be of use in relation to other horticultural carriers or arrangements.

Figure 6:
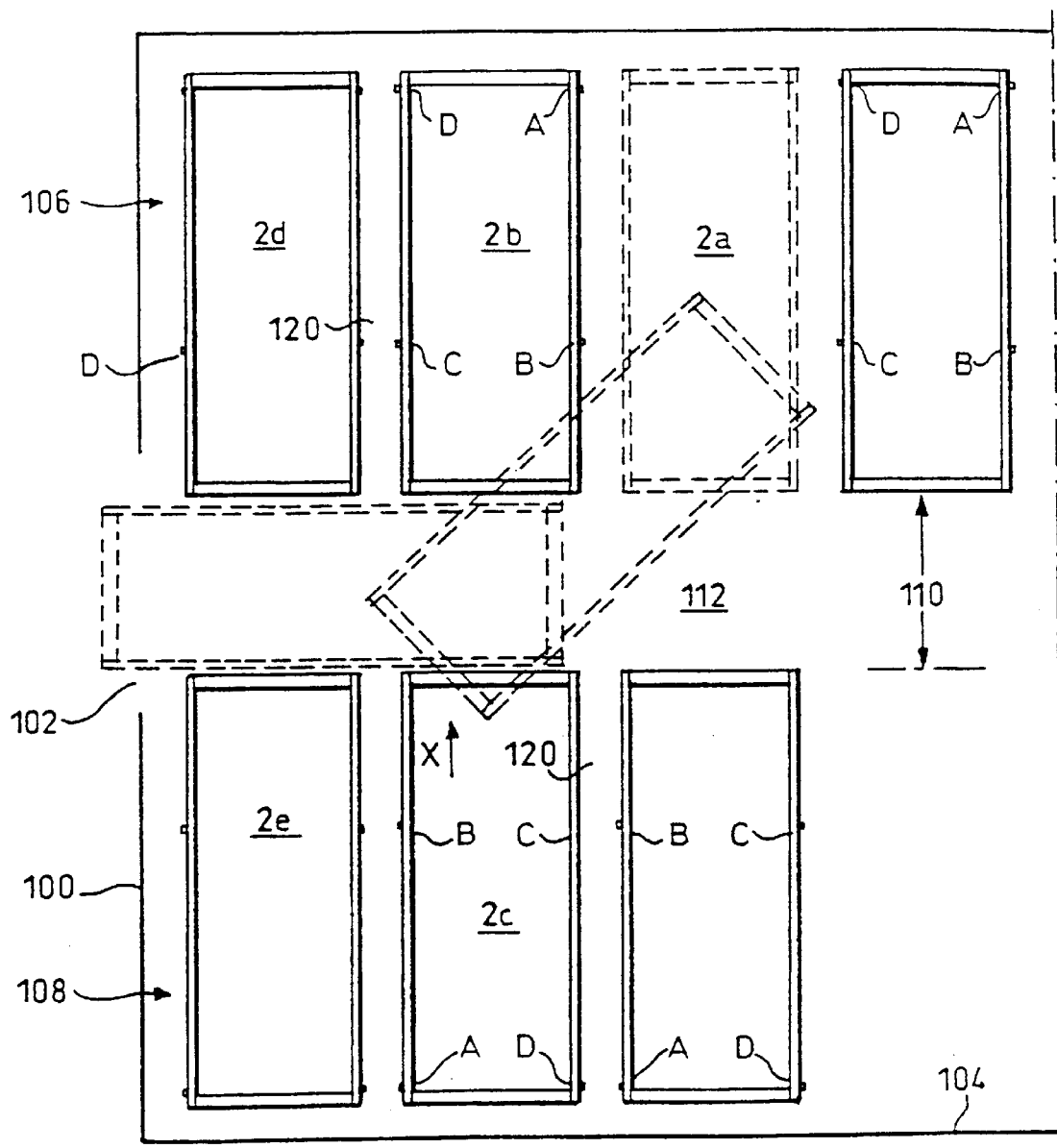
FIG. 6 is too plan view of a part of a confined space in which a plurality of trays are arranged for illustrating a system for manipulating trays in a horticultural scenario.
Figure 7:
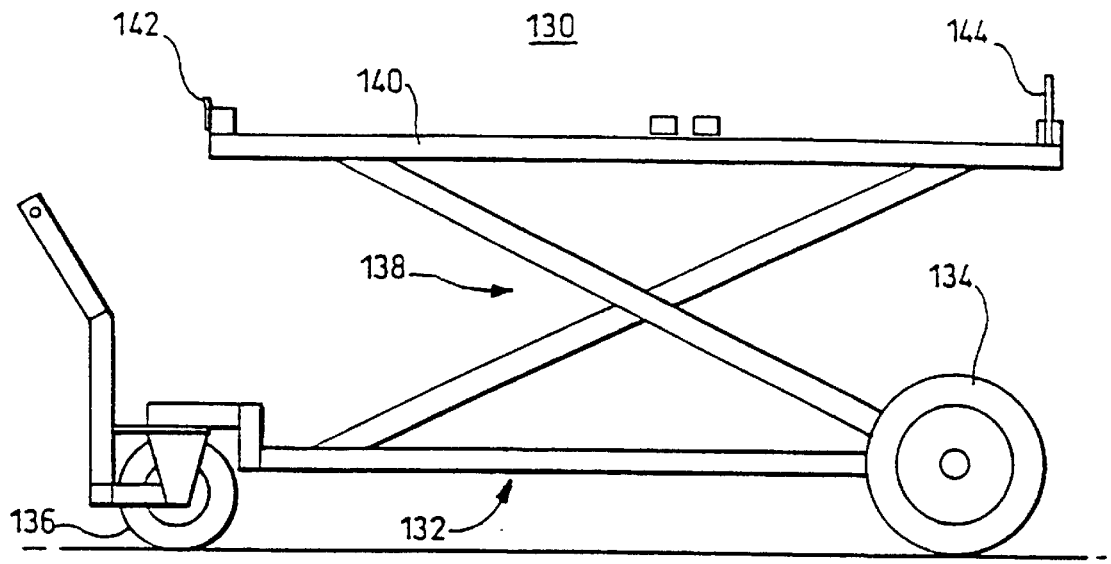
FIGS. 7, 8 and 9 are, respectively, a side elevation, an end elevation and a top plan view of a carriage device with a support platform in an uppermost position.
Figure 8:
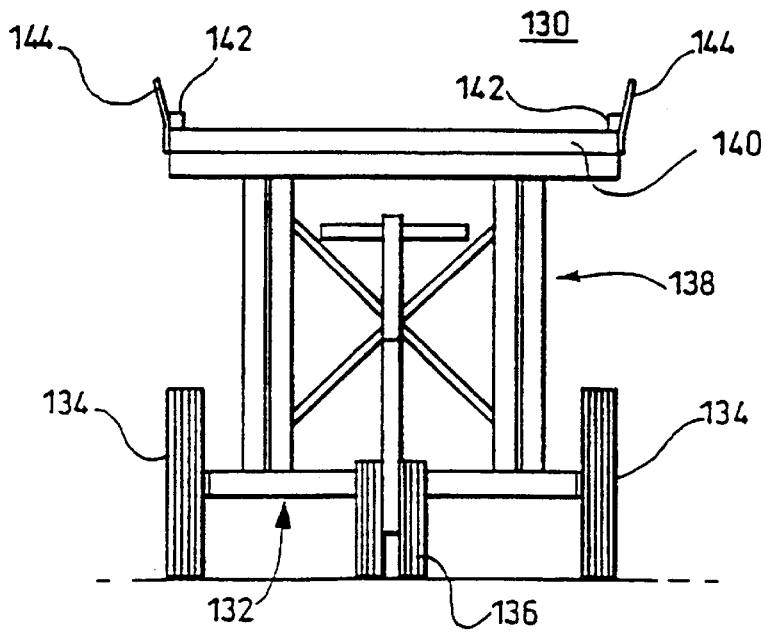
Figure 9:
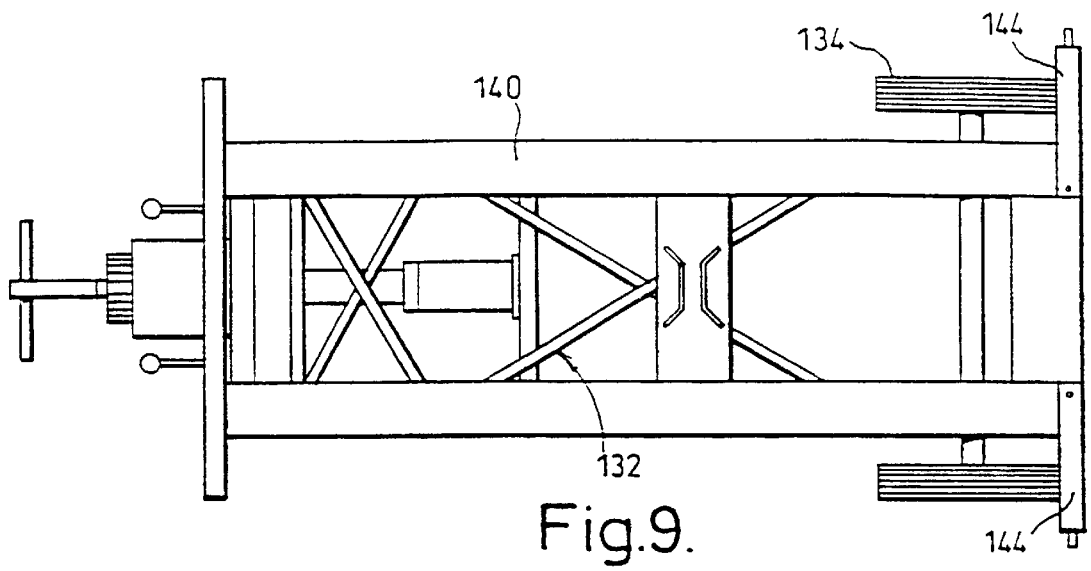
Figure 10:
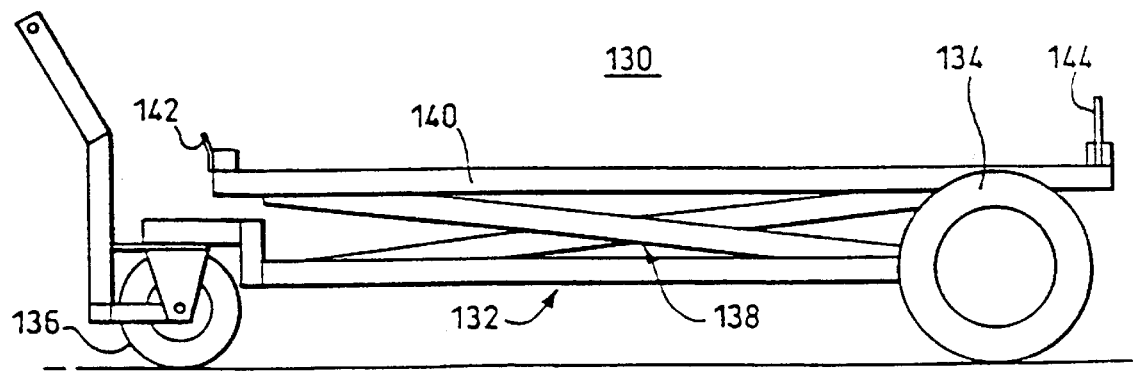
FIG. 10 is a side elevation of the carriage device with the support platform in a lowermost position.

Referring to FIG. 6, there is shown a greenhouse having an end wall 100, in which a doorway 102 is defined, and spaced apart side walls 104. Trays 2 are arranged side by side in first row 106 and second row 108. The trays 2 are supported on four legs 50 arranged within channels 28 at respective positions A, B, C and D on the trays. Thus, the other channels 28 (i.e. channels E, F on member 4 and opposing channels on member 6—see FIGS. 1 and 2) are not engaged by a leg 50. The distance 110 between rows 106, 108 is slightly greater than the width of a tray 2 and, consequently, insufficient space is defined between the trays to allow a tray 2a, for example, to be moved from its position in row 106 into aisle 112 and out of doorway 102. This problem is overcome by driving a carriage device (described hereinafter) underneath tray 2a and supporting it on the device; removing legs 50 from tray 2a (which legs before removal correspond to those on the, other trays), lowering the tray 2a so that its upper surface is below the level of the lowermost surface of the other trays 2b and 2c at least; and driving the carriage device into aisle 112 and out of doorway 102 so that tray 2a moves partially underneath trays 2b and 2c. It should be appreciated that, during the passage, tray 2a may move relatively close to legs 50 on the other trays (especially the leg at position 2 on tray 2b) but the legs are positioned so as not to impede travel of tray 2a.

The other trays 2 in rows 106, 108 can be moved in a similar manner to tray 2a, although it will be appreciated that trays 2d and 2e are initially moved into aisle 112 in an opposite direction to the movement of tray 2a and then reversed out of doorway 102.

Whilst the legs 50 of trays 2 are shown in FIG. 6 at positions A, B, C and D, the legs may only be arranged in these positions during movement of trays 2 into or out of the greenhouse. It will be appreciated that the trays are less stable with legs in positions A, B, C and D compared to when legs are at each corner of the trays (i.e. at positions A, D, E, F). Thus, when trays are not being moved, the legs may be arranged at each corner. In some cases, the trays may be moved outside into a field or the like, for example during appropriate weather conditions. In this case, it is preferred that the trays are as stable as possible.

It is preferred that narrow aisles 120 are defined between trays 2 in the same row so that personnel can pass between trays 2 to tend plants growing in the trays. However, in some situations, trays 2 may be arranged closer together. Additionally, whilst it is preferred that distance 112 is greater than the width of a tray 2, the distance could be less, in which case a tray may pass under trays in both rows during its passage between the rows of trays and out of doorway 102. In fact, the aisle width may be approximately half the width of the trays, in one embodiment.

A carriage device 130 for moving trays 2 is shown in FIGS. 7 to 10. It comprises a chassis 132 supporting rear wheels 135 and a front steerable wheel 136. A scissor list arrangement 138 is supported on the chassis 132 and supports a lifting platform 140. The scissor lift arrangement is moveable between the lowermost and uppermost positions (FIGS. 10 and 7 respectively) either by actuating a hydraulic arrangement (not shown) or a manual lifting arrangement (not shown).

The platform 140 is arranged to cooperate with the underside of the trays 2 and, to this end, includes spaced apart front engagement members 142 arranged to engage opposing support flanges 26 of the trays and retractable tray guides 144 which are arranged to be moved into positions where they may engage the outside of lips 25 on the flanges 26.

Figure 11:
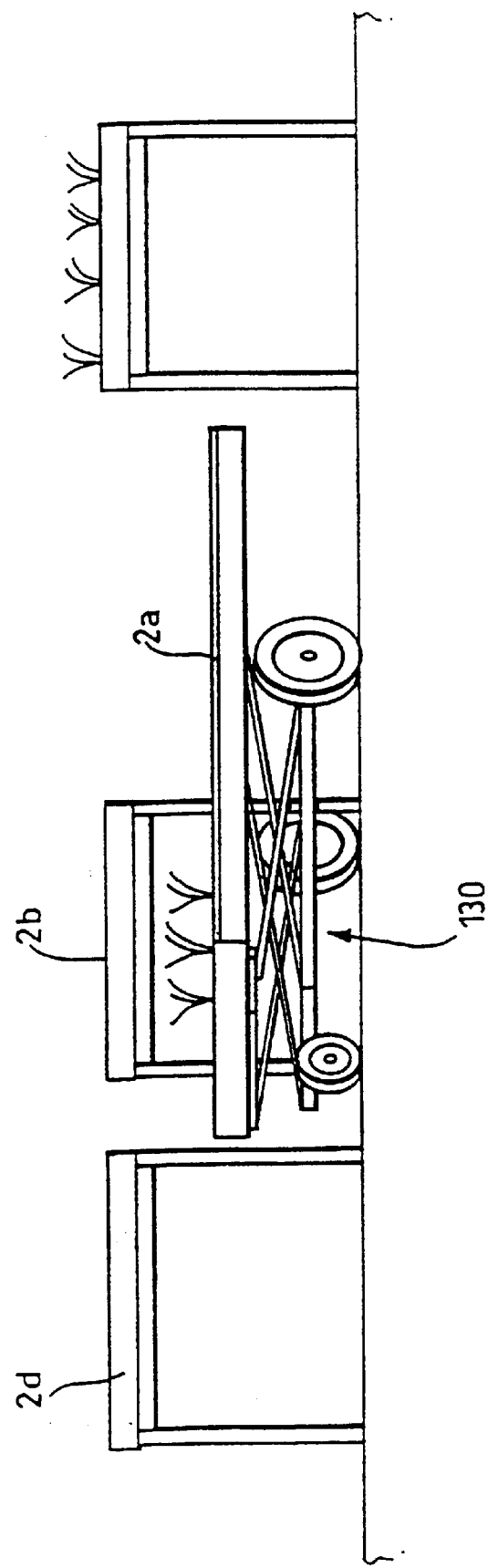
FIG. 11 is a side view in the direction of arrow X of FIG. 6 showing a tray during movement into an aisle between rows of trays prior to passage out of a greenhouse.

The carriage device, with platform 140 in its lowermost position, is arranged to be driven (for example by being pushed and/or pulled manually) underneath, for example, table 2a of FIG. 6 so that platform 140 lies underneath an area of the table 2a between the legs which are initially engaged at positions A, B, C and D. The platform can then be raised (without being obstructed by the legs) so that it supports the tray. Thereafter, the legs can be removed by pulling pairs of legs apart and, subsequently, the carriage device can be pulled into aisle 112 (see FIG. 11) and out of the greenhouse. Once out of the greenhouse and in a desired position, the platform may be raised; the legs re-engaged with the tray; and the carriage device moved away from the tray.

Other apparatus shown in FIG. 1 may be provided for cooperation with tray 2 in order to further mechanise the cultivation of plants. Referring to the figure, a cutting apparatus 150 includes a frame 152 which supports horizontally extending spaced apart plates 154. The plates 154 support a plurality of rollers 156 whose rotational axes extends perpendicular to the plates. The apparatus 150 is thereby arranged so that it can be supported on the trays 2 with the plates 154 abutting flanges 26 and the rollers 156 arranged to run along the outwardly facing surfaces of the lips 25.

The frame 152 also supports a height adjustable cutter 158, a rotatably mounted brush 160, a drive unit 159 and a collector body 162, having a hinged outlet door (not shown).

In use, the apparatus 150 is placed at one end of a tray 2 and is then driven, under the power of unit 159, towards the other end. During this passage, the brush 160 rotates and urges the tops of plants in the tray towards the cutter, which trims them. The cuttings are direction into the collector 162. It will be appreciated that use of the apparatus makes trimming the plants extremely easy and ensures they are all trimmed to approximately the same height.

FIG. 1 also shows a cultivator 170 which includes a frame 172 which includes a support 174 which supports pivotably mounted downwardly depending fingers 176. Inner fingers are bifurcated towards their ends so that each defines two cultivator elements, whereas outermost fingers 176b include a single cultivator element. The number of cultivator elements in total equals twice the number of elongate channels 16 defined by sheet 14.

The frame 172 also includes L-section brackets 178, each of which supports rollers 156.

The cultivator 170 is arranged to engage the tray n a manner similar to the engagement of the cutting apparatus 150 with the tray. Once engaged, the cultivator may be drawn along the tray so that the cultivator elements break up the soil surface on each side of the plants growing in the trays. This act may reduce the risk of certain soil borne diseases and/or may optimise the conditions for plant growth.

FIG. 1 furthermore shows a storage trolley 180. The trolley includes support flanges 26 and depending lips 25 which correspond in size and/or position to the lips and flanges of the tray 2. Thus, the trolley may be moved into position adjacent a tray 2 so that the flanges 26/lips 25 of the trolley and trays are adjacent and define substantially a continuum. Then, the cutting apparatus 150 may be slid from the tray onto the trolley 180 and the collected cuttings emptied thereinto after use. Additionally, the trolley may be used to transport the cutting apparatus 150 and/or the cultivating apparatus 170 to and/or from each of the trays 4.

The trays 4 and the other items which cooperate may be of any suitable sizes. In the embodiment shown, length "a", width "b" and height "c" (see FIG. 2) are about 3000 mm, 1000 mm and 950 mm respectively. The width of aisle 110 ("d") (FIG. 6) is suitably 1250 mm. The maximum length "e" (FIG. 10) of carriage device 130 is suitably about 2300 mm, with width "f" (FIG. 8) being about 1100 mm, and the height "g" (FIG. 10) being about 475 mm.

Whilst the embodiment of FIG. 6 shows a relatively wide gap 120 between trays 2, in other embodiments, for example the embodiments of FIGS. 12 to 16, the trays may be closer to and/or abut one another.

Figure 2:
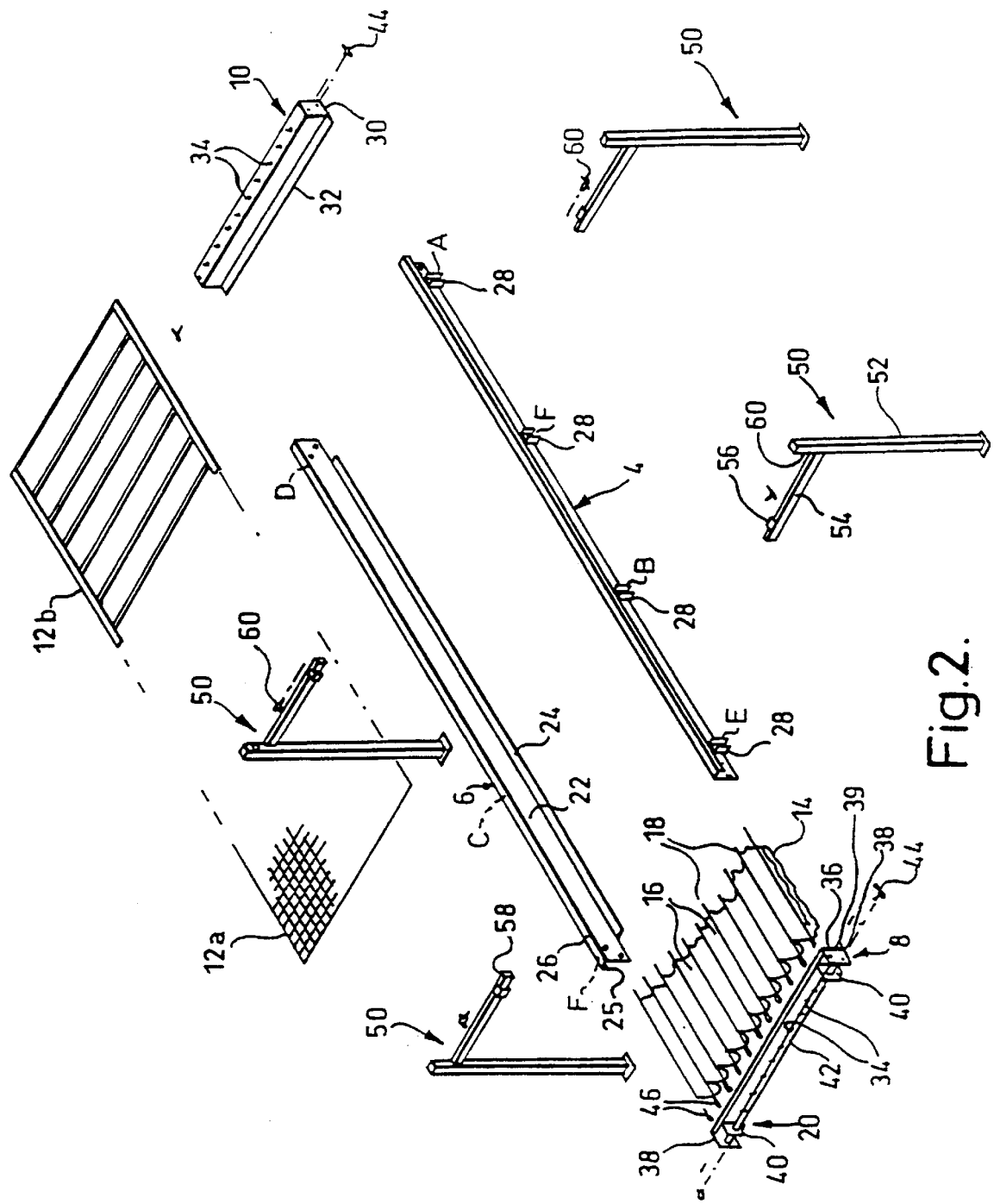
FIG. 2 is an exploded perspective view of the apparatus of FIG. 1.
Figures 3, 4:
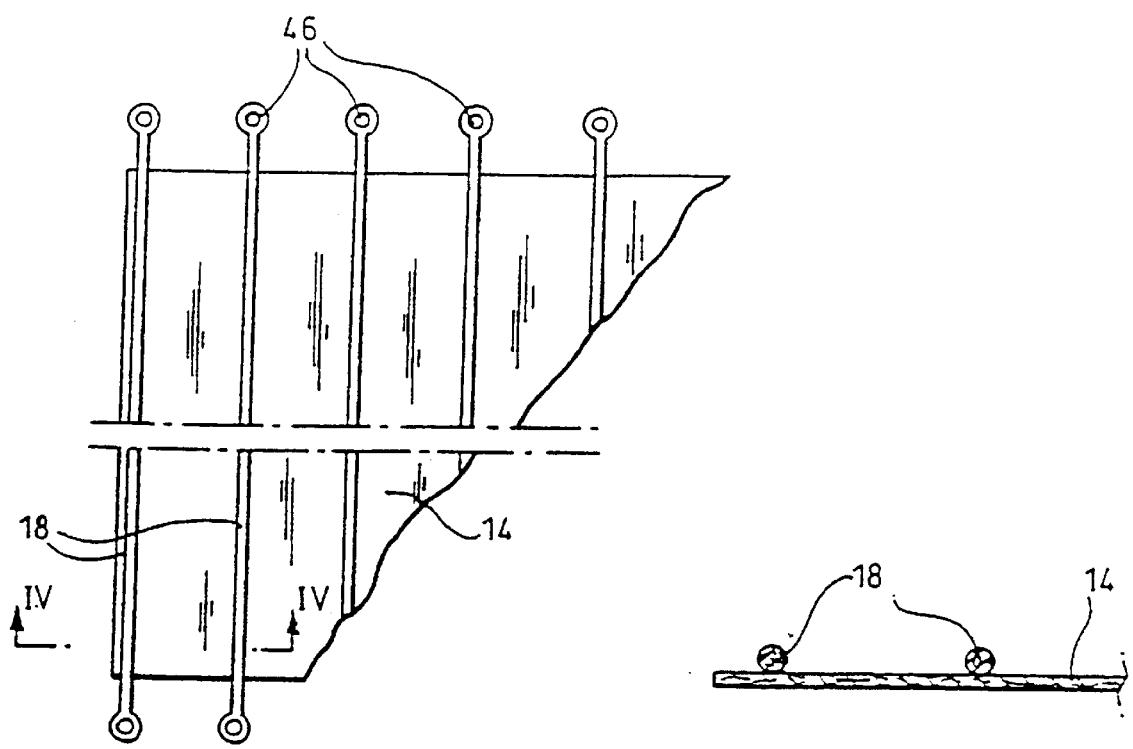
FIG. 3 is a plan view of a part of a receptacle defining sheet of the tray.
FIG. 4 is a cross-section along line iv—iv of FIG. 3.
Figure 12:
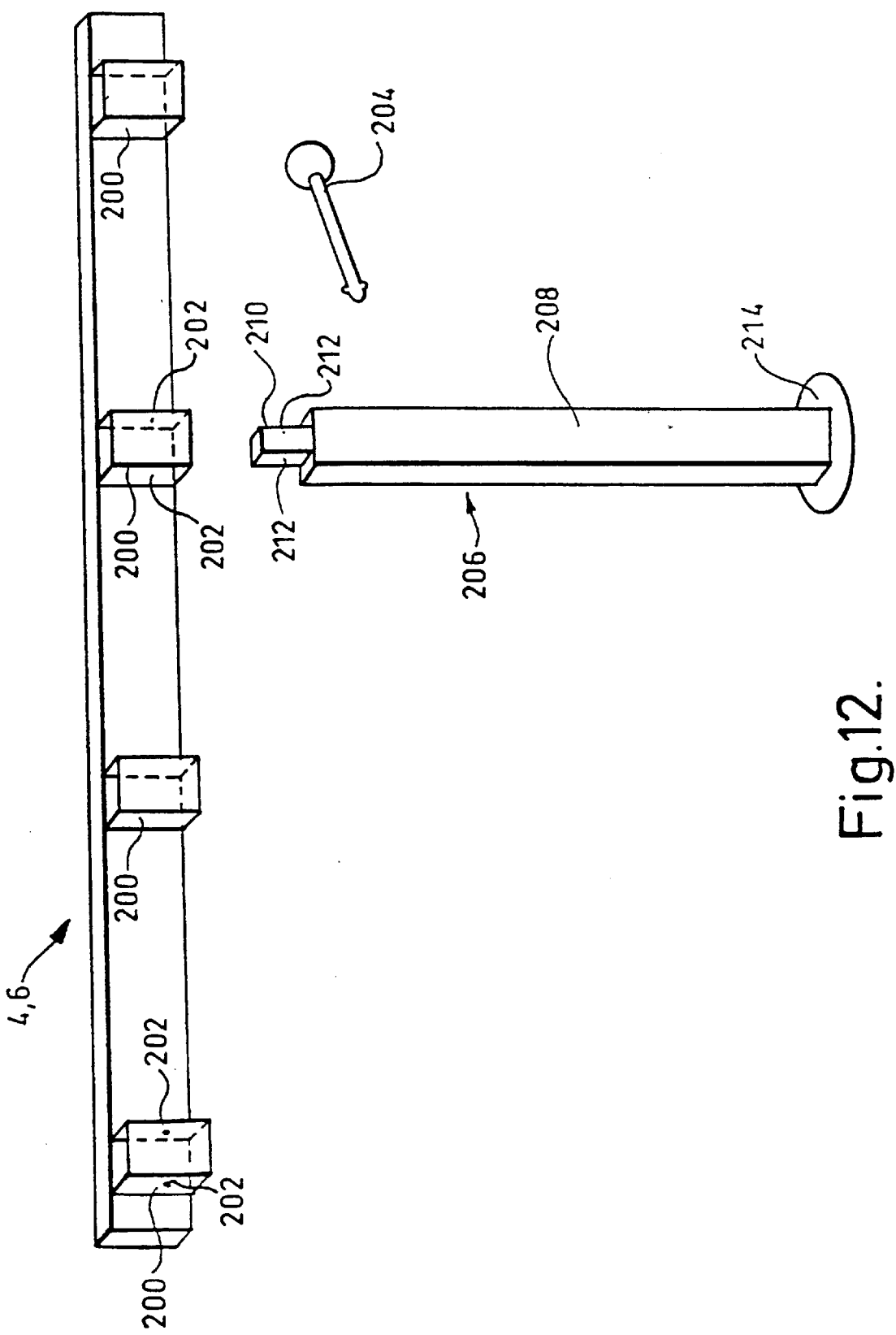
FIG. 12 shows an alternative means of releasably securing a leg to a tray.

Referring to FIG. 12, elongate side members 4 and 6 of tray 2 include box section retainers 200 spaced apart in the same way as channels 28 of FIG. 2. The retainers include aligned openings 202 for receiving a securement pin 204. Legs 206 are arranged to be releasably secured within the retainers 200. Each leg includes a main support part 208, a narrow top part 210 which includes aligned openings 212 and a foot plate 214. The legs can easily be engaged with selected retainers 200, by insertion of top part 210 in a retainer 200 and then a pin 204 can be engaged in aligned openings 202 and 212. It should be appreciated that whilst the narrow part 210 may aid location of the legs in position, it need not be provided, in which case main part 208 will include openings 212.

Four legs 206 may support the tray as described for legs 50 above. When the tray is to be moved, it may be raised slightly, so the legs are spaced from the ground, whereupon the pins 204 are removed to allow detachment of legs 206. Removable of the pins may be effected remotely. For example, the pins may be attached to chains (or the like) which are arranged in a convenient position so that an operator can pull them to remove the pins. Alternatively, a lever arrangement (or the like) may be provided for removing pins which secure the legs.

As an alternative to the removable legs described above, legs may be pivotably mounted. In this case, referring to FIG. 13, legs at positions A and D are arranged to pivot inwardly, transversely to the elongate extent of sides 4, 6, whereas legs at positions B and C are arranged to pivot parallel to the elongate extent of sides 4, 6. This ensures that the legs are not impeded by carriage device 130.

The pivotal mounting of the legs may be achieved in any suitable manner. An example is shown in FIGS. 14 to 16.

Figure 14:
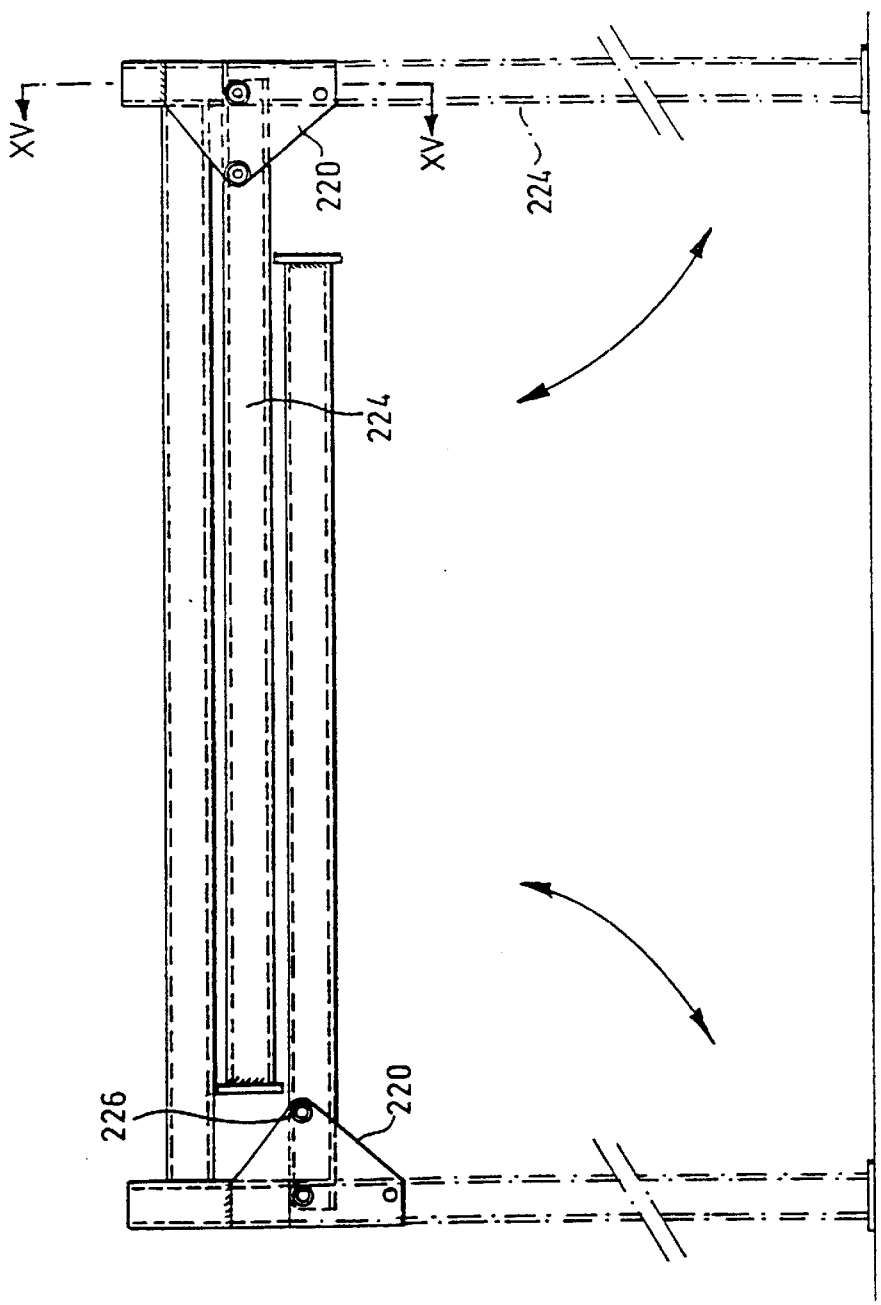
FIG. 14 is a view of the tray of FIG. 13 taken in the direct of arrow XIV.
Figure 13:
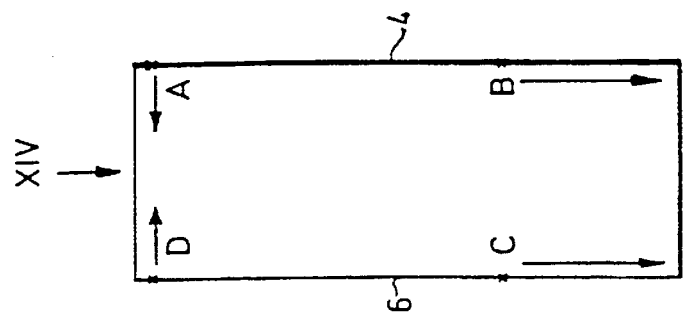
FIG. 13 is a schematic top plan view of a tray including arrows to show the movement of pivotably mounted legs.
Figure 15:
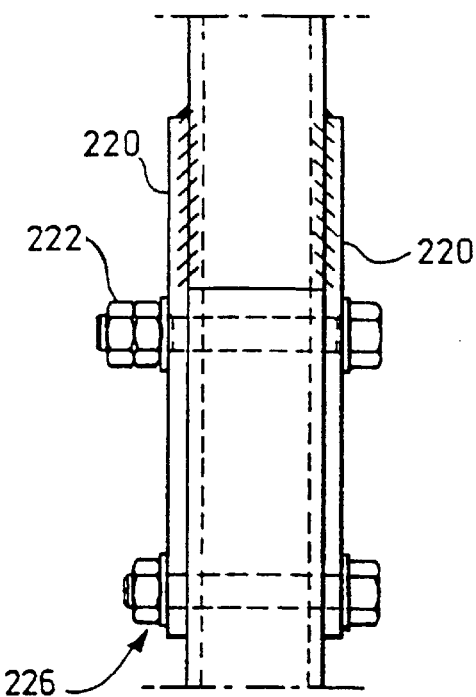
FIG. 15 is a cross-section alone line XV—XV of FIG. 14 except that the leg is in its lowered position.
Figure 16:
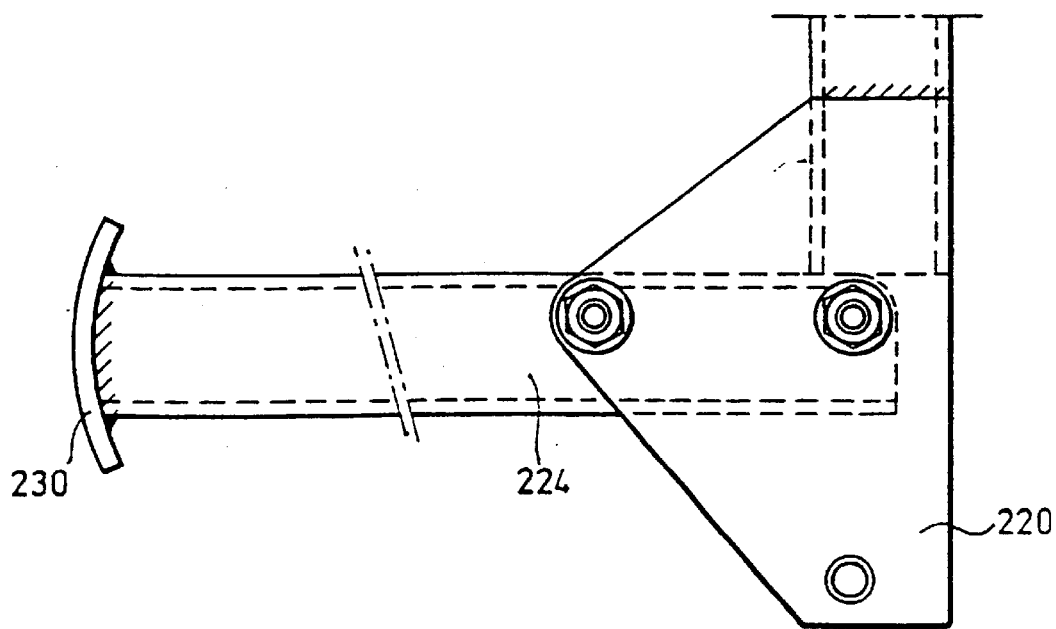
FIG. 16 is a side view of a leg having a curved footplate.

Referring to FIGS. 14 and 15, support plates 220 are provided at an end of a tray which places pivotably support a leg 224 by means of a pivot bolt arrangement 222. The leg 224 is secured in its lowered position (shown in dashed lines in FIG. 14) by a lock bolt arrangement 226.

The legs at positions B and C may be pivotably mounted using a similar arrangement to that of FIGS. 14 and 15. However, the footplate 230 of such legs is curved, as shown in FIG. 16.

In use, a tray 2 with the legs of FIGS. 13 to 16 supporting it is raised from the ground and legs at position A and D are folded inwardly and secured in position. Legs at positions B and C, however, drag on the ground as the tray is moved into aisle 112 (FIG. 6). (The curved footplate 230 facilitates dragging of the legs). When the tray is in aisle 112, the legs at positions B and C may be secured in stowed positions.

Whilst the pivotable legs described may be arranged at positions A, B, C and D, suitable brackets may be provided at positions E, F, G and H to enable the legs to be arranged at the aforesaid positions if desired.

Figure 17:
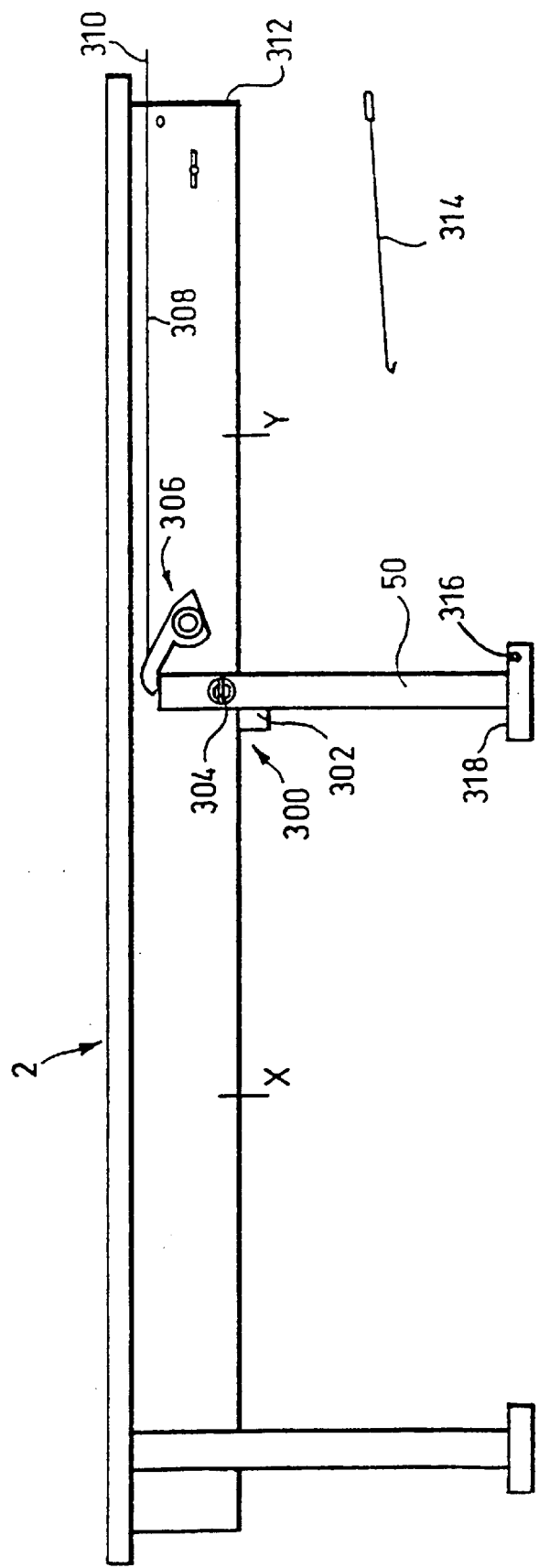
FIG. 17 is a side view-of another tray.
Figure 18:
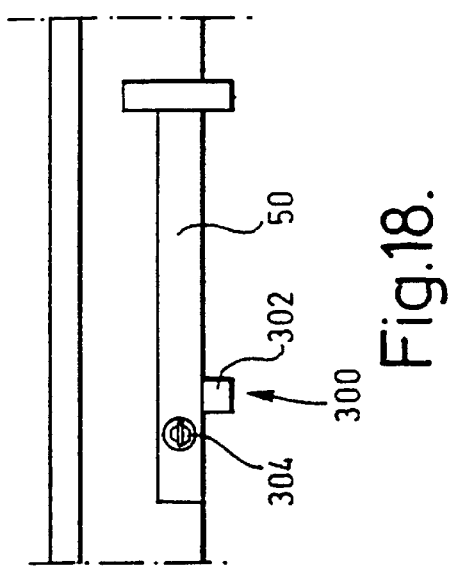
FIG. 18 is a side view of a part of the tray of FIG. 17 with a leg thereof in a storage position.

The tray 2 of FIGS. 17 and 18 is similar in many respects to the other trays described herein; however, leg assembly 300 is different. The leg assembly 300 includes upstanding part 50 to which a laterally and horizontally extending part 302 is attached. Part 302 is arranged to cooperate with a similar part 302 provided on a leg assembly positioned opposite the leg assembly shown in FIG. 17 in a manner similar to the cooperation of parts 54 and 56 shown in FIG. 2. The leg assembly 300 is pivotably mounted by means of a nut/bolt arrangement 304 which is positioned so that the leg assembly can pivot between the FIG. 17 and FIG. 18 positions. A safety catch arrangement 306 is associated with an upper end of the leg assembly for releasably retaining the assembly in the FIG. 17 position. A length of wire 308 is fixed to the catch arrangement and its free end 310 is positioned adjacent end 312 of tray 2. The wire allows the catch arrangement 301 to be operated remotely. A hook bar 314 is also provided and arranged to be used by an operator positioned adjacent end 312 to engage a slot 316 in foot 318 of leg 50 to cause pivotal movement of the leg.

Figure 19:
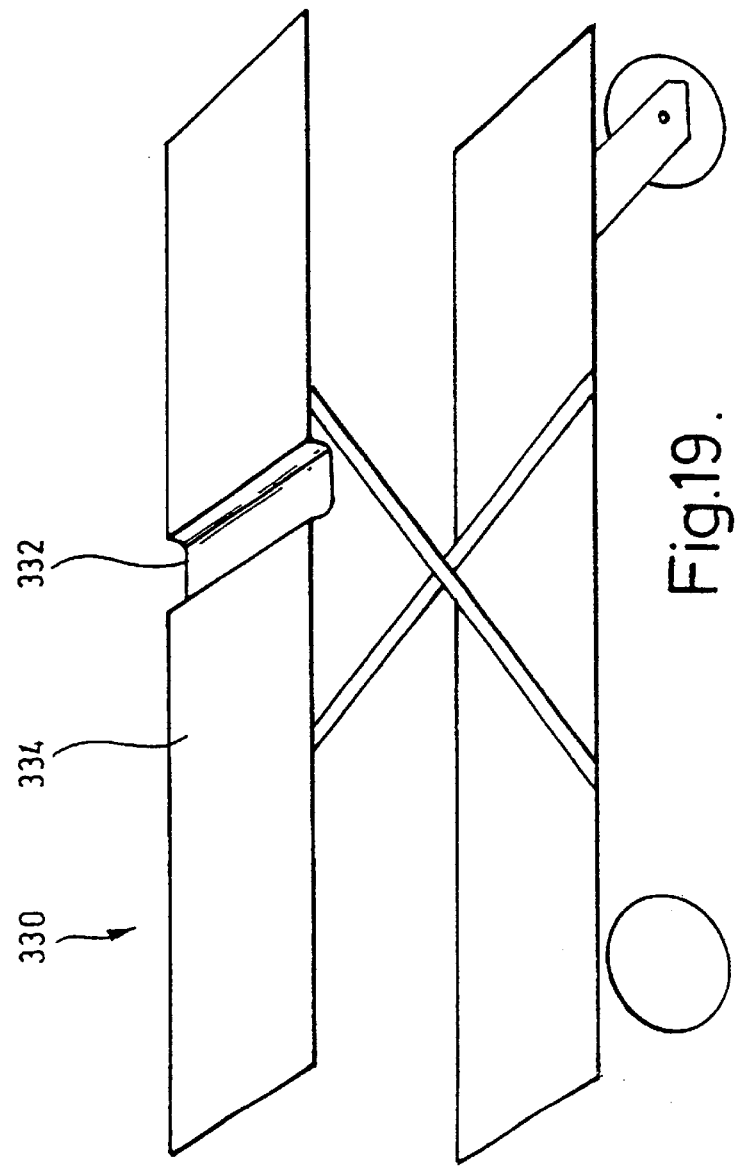
FIG. 19 is a side view of a carriage device for cooperation with the tray of FIG. 17.

Referring to FIG. 19, the carriage device 330 is similar to the carriage device 130 of FIGS. 7 to 10; however, device 330 includes a groove/channel 332 which is arranged to accommodate part 302 of leg 50 when the tray is supported on surface 334 of the device 330, as described hereinafter.

Figure 20:
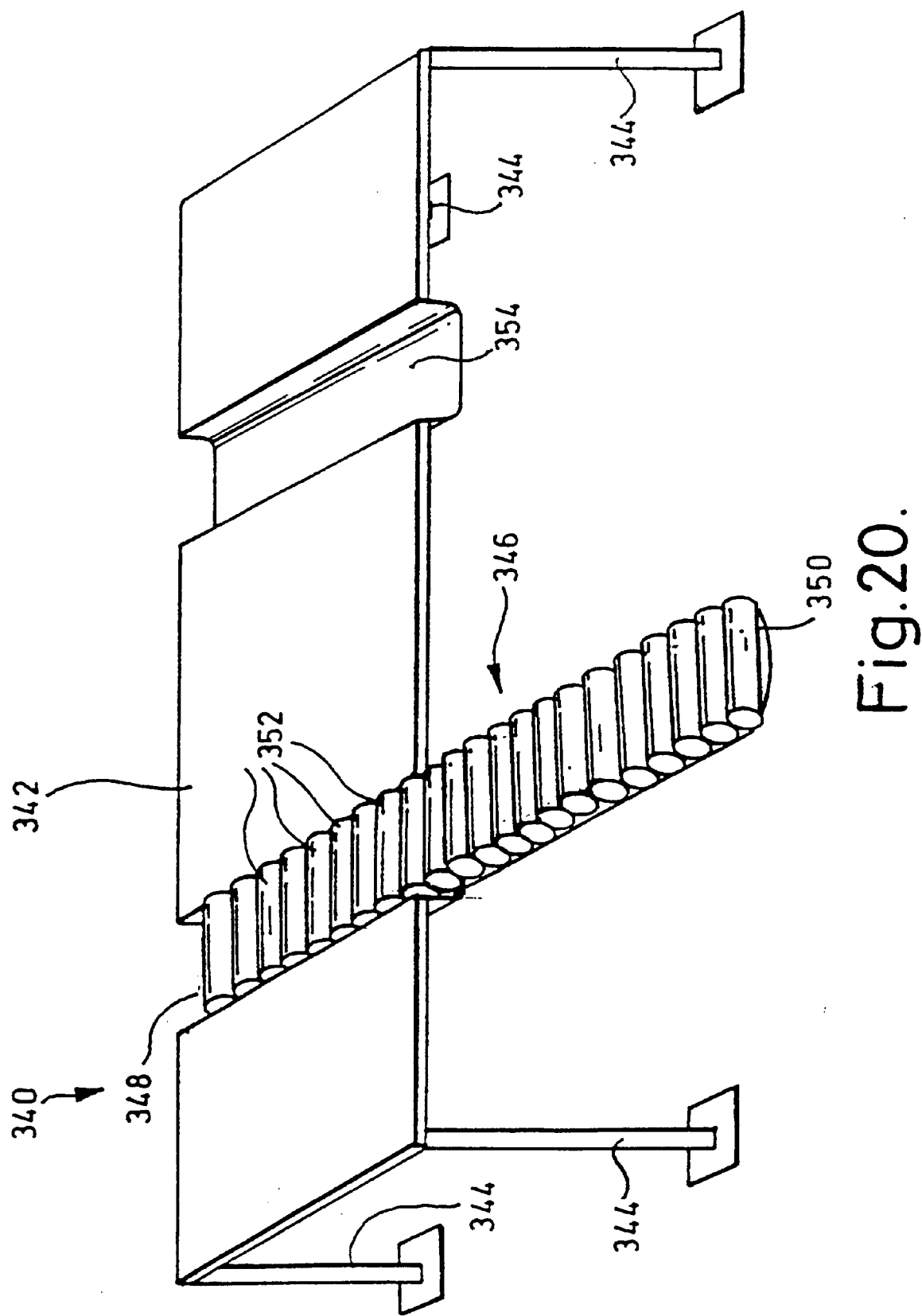
FIG. 20 is a perspective view of a dismantling table for cooperation with the tray and carriage device of FIGS. 17 and 19.

Referring to FIG. 20, the dismantling table 340 includes a table top 342 supported on legs 344. A conveyor arrangement 346 extends from a position 348 on one side of the table to a position 350 laterally spaced from the table top 342. The conveyor arrangement includes a multiplicity of rollers 352, the outer surface of which is slightly above the level of the table top 342. A groove/channel 354 extends parallel to conveyor arrangement 346 and is arranged to accommodate part 302 of leg 50 when the tray is supported on table top 342 as described hereinafter.

The apparatus of FIGS. 17 to 20 may be used together as follows

With the tray 2 of FIG. 17 positioned in a greenhouse, for example as described in FIG. 6, carriage device 330 may be driven suitably under its own power and/or by remote control under the tray so that part 302 is above the left hand side of groove/channel 332 and the ends of the device are positioned opposite points X and Y of the tray. The surface 334 of the carriage device is then raised to lift the tray from the floor. It will be appreciated that the carriage device only contacts the tray between points X and Y. An operator can then release catch arrangement 306 and, using hook bar 314, can cause leg 50 to pivot to the FIG. 18 position in which it can be retained. When so disposed the part 302 is adjacent the right hand side of groove/channel 332. Leg 51 may also be removed at a convenient time. The tray 2 is then driven out of the greenhouse to the dismantling table and the carriage device positioned with the groove/channel 332 of the carriage device and the groove 354 of the table opposite one another and with the areas of the tray to the left of position X as seen in FIG. 17 above the conveyor 346. The carriage device can then be lowered so that the tray abuts the rollers 352 of the conveyor and then an operator can push the tray from the carriage device onto the table so that part 302 slides within groove/channel 354. Once on the table, the tray can be dismantled and any plants removed.

In an alternative embodiment (not shown) two grooves/channels 332, 354 may be associated with the carriage device and/or dismantling table to enable trays to be manipulated by a fork lift truck (or the like).

Figure 21:
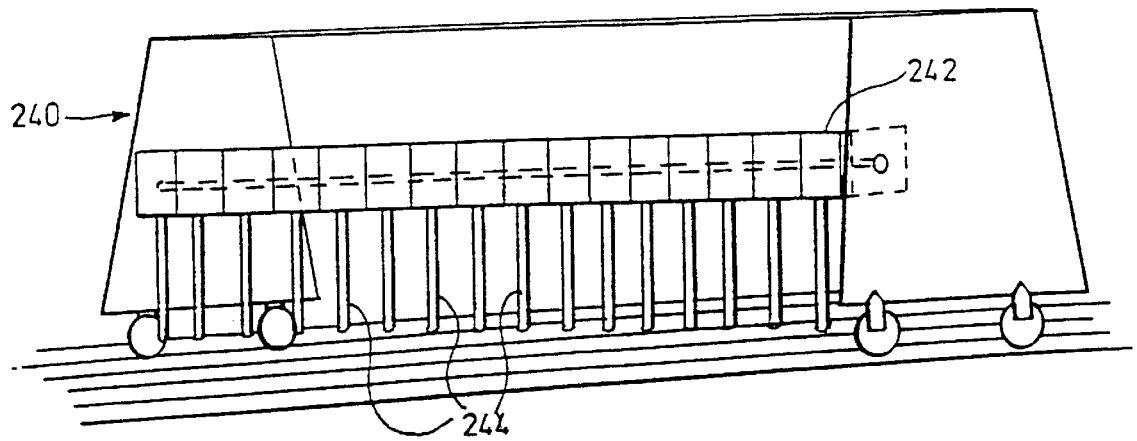
FIG. 21 is a schematic perspective view of a tray cooperating with a seeder.

The trays 2 described may cooperate with other apparatus to increase the mechahisation of plant cultivation. For example, referring to FIG. 21, a seeder 240 may be arranged to engage the tray in a manner similar to the engagement of the cutting apparatus 150 with the tray. The seeder includes a seed holder 242 which is arranged to deliver seeds to a plurality of seed delivery tubes 244 which are arranged to deliver seeds into each channel 16 defined in the trays.

Figure 22:
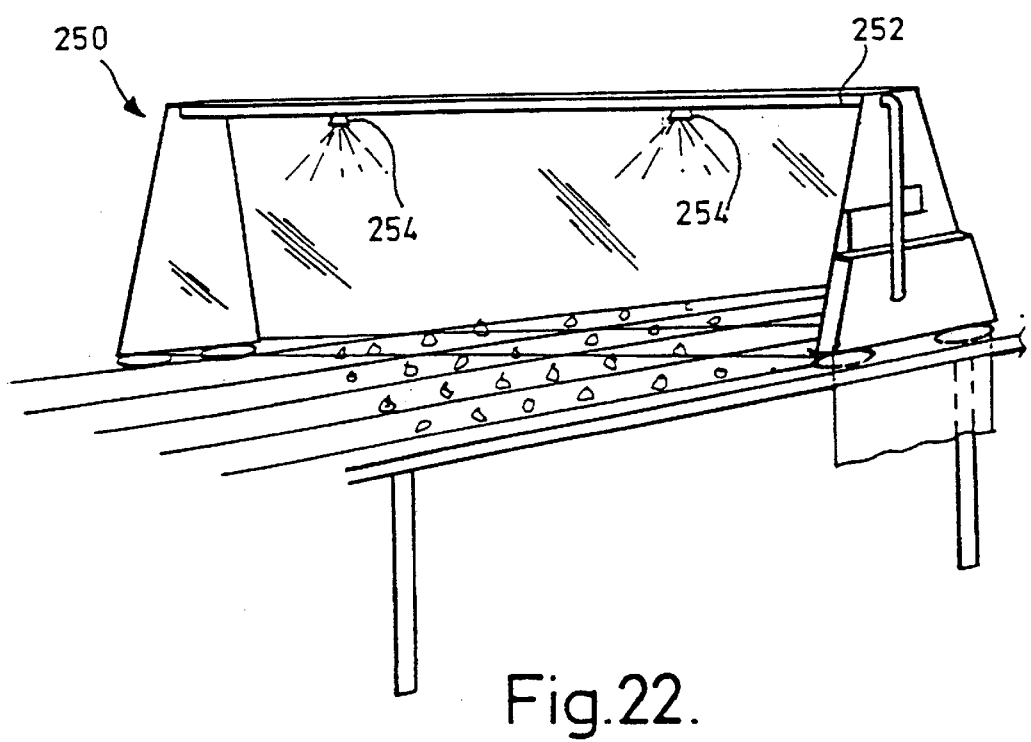
FIG. 22 is a schematic perspective view of a tray cooperating with a spraying and watering device.

A spraying and watering device 250, shown in FIG. 22, is arranged to engage the tray as described above. It includes a framework 252 which supports a pressurised tank, a pump and battery for supplying liquid to spray nozzles 254. A Perspex (Trade Mark) housing is provided to prevent spray drift and protect an operator. At its sides, the housing is extended by means of pieces of textile curtaining material.

Figure 23:
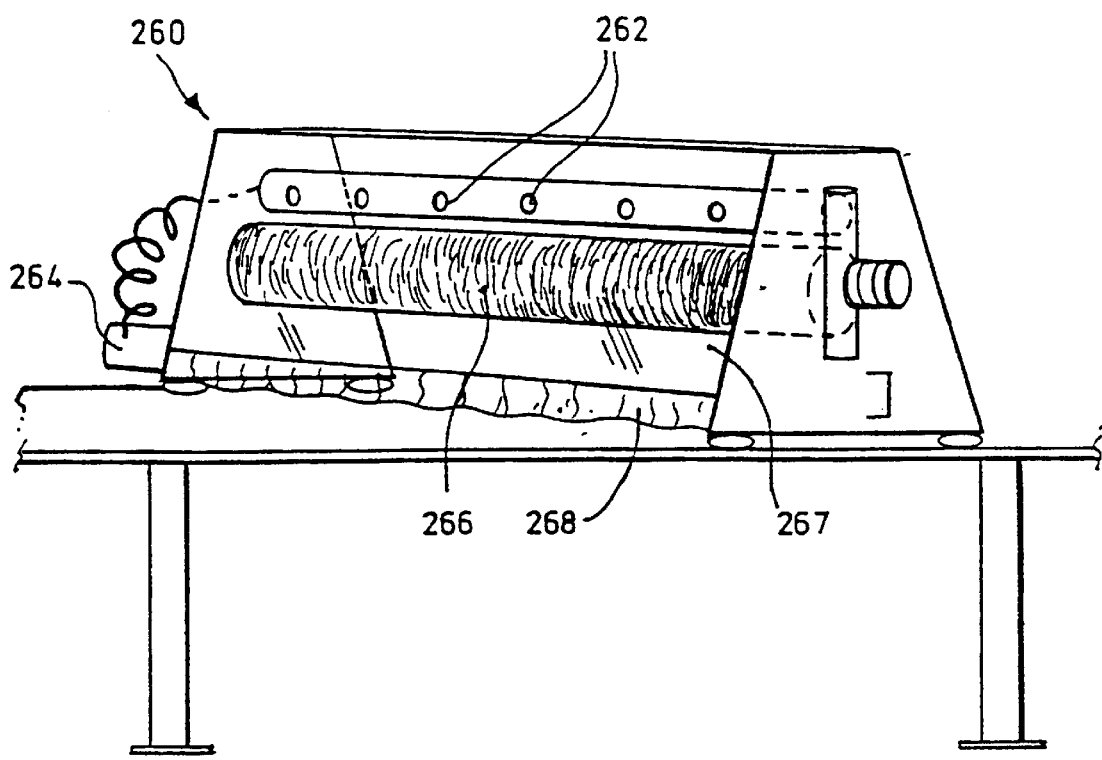
FIG. 23 is a schematic perspective view of a tray cooperating with a vacuum device.

A vacuum device 260, shown in FIG. 23, is arranged to engage the tray as described above. The device comprises a framework which support suction tubes having inlets 262. The tubes are connected to a suction pump 264. A height adjustable rotatably mounted soft brush 266 is also supported by the framework.

A Perspex (Trade Mark) housing 267 surrounds the framework. Light strips of curtaining extend downwardly from the long side of the housing. In use, the device 260 is drawn along a tray by hand, with the brush 266 at a suitable height to touch the plants below, thereby to dislodge insects therefrom, whereupon the insects are sucked up into the tubes 262.

Figure 24:
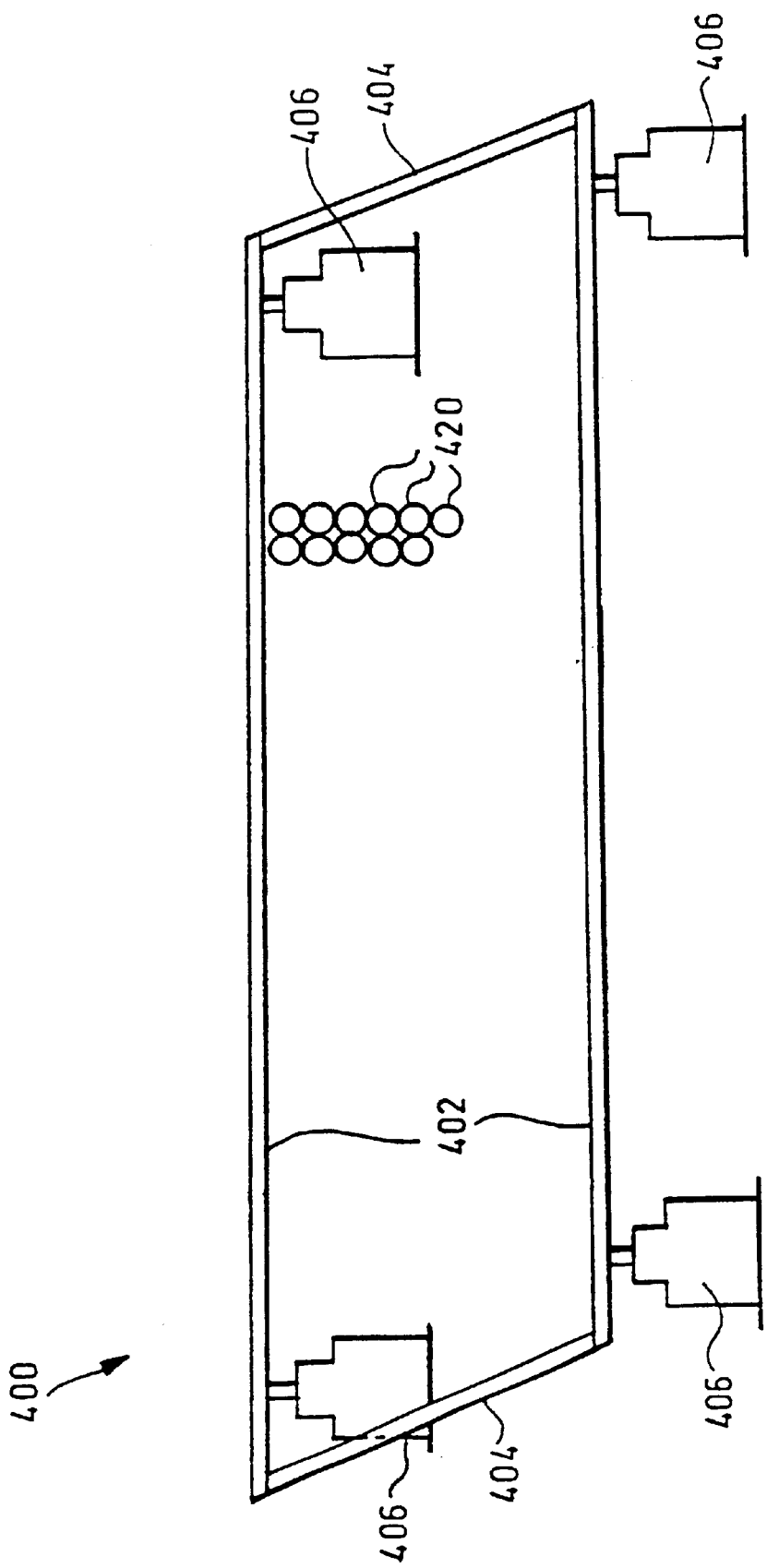
FIG. 24 is a schematic perspective view of a portable frame for cooperation with a cutting apparatus.

Referring to FIG. 24, the frame 400 comprises rigidly spaced apart parallel elongate tracks 402, with support struts 404 (or the like) extending between. The tracks 402 are supported by four support legs 406 which are height adjustable for adjusting the level/angle of the tracks.

The frame is arranged to cooperate with the cutting apparatus 150 (FIG. 1). In use, the frame may be positioned over an array of, for example, plants growing in pots; the frame may be levelled; and then the cutting apparatus engaged with frame and used to trim the plants as described above. The frame may easily be moved to another location as required. Advantageously, the arrangement enables plants in pots (or in other growing receptacles) to be cut to substantially the same height in a very quick and easy manner.

The frame 400 may be used to support other apparatus/devices for cooperation with plants.

As an alternative to a movable frame 400, a frame may be substantially permanently fixed in position, for example, to define a bed size of 1.2 m and then plants could be grown within the confines of the frame.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of moving a first horticultural apparatus which is arranged in a first position in a horticultural environment to a second position, wherein the horticultural environment is such that said first horticultural apparatus cannot be moved from said first position to said second position whilst maintaining said first horticultural apparatus at a first height relative to a second horticultural apparatus, the method comprising adjusting the height of the first horticultural apparatus relative to that of said second horticultural apparatus and using a transportation means to move said first horticultural apparatus to said second position, wherein a second support means for supporting said second apparatus at a first height is provided, wherein said second support means includes a first support assembly and a second support assembly, wherein during said movement from said first position to said second position, said first and second support assemblies are asymmetrically arranged on opposite sides of a centre of gravity of said second apparatus.

2. A method according to claim 1, wherein said first apparatus is moved along a substantially horizontal plane during movement to said second position.

3. A method according to claim 1, wherein said first apparatus is arranged under part of said second apparatus during its movement between said first and second positions.

4. A method according to claim 1, wherein said horticultural environment includes a third horticultural apparatus and said first apparatus cannot be moved from said first position to said second position whilst maintaining said first apparatus at a said first height relative to said third apparatus, wherein the first apparatus passes under part of the second and third apparatuses during movement from said first position to said second position.

5. A method according to claim 4, wherein said horticultural environment includes a plurality of horticultural apparatuses in a first row, wherein said first row includes said first and second apparatuses and said horticultural environment includes a plurality of horticultural apparatuses in a second row which is spaced from said first row-and which includes said third apparatus.

6. A method according to claim 5, wherein said first and second rows extend substantially parallel to one another with a gap being defined between said first and second rows for defining an aisle for passage of said first apparatus out of said horticultural environment.

7. A method according to claim 1, wherein said transportation means is arranged both to adjust the height of the first apparatus relative to said second apparatus and to move it to said second position.

8. A method according to claim 1, wherein a first support means is provided for supporting said first apparatus at a first height, wherein said first support means includes a first support assembly on one side of the centre of gravity of said first apparatus and a second support assembly on an opposite side of the centre of gravity, wherein said first support assembly is securable at a plurality of positions on said one side which positions differ in their distance from the centre of gravity of the first apparatus.

9. A method according to claim 8, wherein said first support assembly and/or said second support assembly comprise a pair of legs which are arranged to be fixed at or adjacent opposite sides of the first apparatus.

10. A method according to claim 9, wherein said first support assembly and/or said second support assembly is/are moveable between an operative position in which said first apparatus is supported thereby and an inoperative position in which said first apparatus may not be supported thereby.

11. A method according to claim 1, wherein said transportation means is a transportation apparatus which comprises a support surface for supporting said first apparatus wherein said support surface is movable between first and second positions.

12. A method according to claim 1, wherein said first horticultural apparatus includes one or more receptacles for growing plants or the like.

13. A method according to claim 1, wherein said first apparatus includes guide means for guiding travel of an accessory means relative to the apparatus.

14. A first horticultural apparatus for use in the method of claim 1, the apparatus comprising:
   a frame which includes first and second side frame members which are rigidly spaced apart by first and second end members wherein said first and second side frame members define a guide means for an accessory means;
   a receptacle means which include a plurality of walls which extend substantially parallel to one another and define a plurality of upwardly open elongate receptacles for growing plants, said receptacle means being supported by said frame and being defined by a folded flexible sheet of material;

a support surface being a component of said frame and abutting a base wall of said receptacle means;

wherein said frame is arranged to be disassembled so that said receptacle means can be detached therefrom and disassembled by pulling said folded flexible sheet of material into a flattened state for removal of growing plants therefrom.

15. Plant cultivating apparatus comprising a first horticultural apparatus according to claim 14, and an accessory means selected from the group comprising trimming means for trimming plants growing in said first apparatus; breaking means for breaking up the surface of a growing medium associated with said first apparatus; storage means; seeding means; means for delivering liquid to said first apparatus, and means for removing insects from said first apparatus.

16. Transportation means which includes a support surface for supporting a first horticultural apparatus according to claim 14, in combination with a first horticultural apparatus according to claim 14.

17. A method of moving a first horticultural apparatus which is arranged in a first position in a horticultural environment to a second position, wherein the horticultural environment is such that said first horticultural apparatus cannot be moved from said first position to said second position whilst maintaining said first horticultural apparatus at a first height relative to a second horticultural apparatus, the method comprising adjusting the height of the first horticultural apparatus relative to that of said second horticultural apparatus and using a transportation means to move said first horticultural apparatus to said second position, wherein said first apparatus has an elongate axis and during movement of said first apparatus said elongate axis moves through an angle of at least 30°.

* * * * *